(12) United States Patent
Schuknecht et al.

(10) Patent No.: US 11,817,819 B2
(45) Date of Patent: Nov. 14, 2023

(54) AUTOMATED ATTACHMENT OF SOLAR COMPONENTS

(71) Applicant: Array Technologies, Inc., Albuquerque, NM (US)

(72) Inventors: Nathan Schuknecht, Golden, CO (US); Lucas Creasy, Scottsdale, AZ (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 17/812,409

(22) Filed: Jul. 13, 2022

(65) Prior Publication Data
US 2023/0015330 A1    Jan. 19, 2023

Related U.S. Application Data

(60) Provisional application No. 63/221,348, filed on Jul. 13, 2021.

(51) Int. Cl.
*H02S 20/30* (2014.01)
*B23P 21/00* (2006.01)
*H02S 30/10* (2014.01)

(52) U.S. Cl.
CPC ............ *H02S 30/10* (2014.12); *B23P 21/002* (2013.01); *H02S 20/30* (2014.12)

(58) Field of Classification Search
CPC ........ B23P 21/002; H02S 20/00; H02S 20/20; H02S 20/22; H02S 20/23; H02S 30/10
See application file for complete search history.

(56) References Cited

U.S. PATENT DOCUMENTS

| | | | | |
|---|---|---|---|---|
| 9,150,258 B1* | 10/2015 | May | ....................... | B62D 25/06 |
| 9,180,917 B1* | 11/2015 | Wu | ....................... | B62D 25/04 |
| 9,545,958 B1* | 1/2017 | Marchlewski | ........ | B60P 1/4485 |
| 9,868,476 B1* | 1/2018 | Pastrick | ................ | B62D 25/06 |
| 10,277,159 B2* | 4/2019 | Poivet | ...................... | E04D 3/40 |
| 11,063,553 B2* | 7/2021 | Poivet | ..................... | H02S 30/10 |
| 2012/0027550 A1* | 2/2012 | Bellacicco | ............. | H01L 31/18 |
| | | | | 414/547 |
| 2012/0199266 A1* | 8/2012 | Potter | ..................... | H01L 31/18 |
| | | | | 901/43 |

(Continued)

FOREIGN PATENT DOCUMENTS

WO    2013/009409    1/2013

OTHER PUBLICATIONS

International Search Report and Written Opinion dated Nov. 28, 2022 in PCT Application No. PCT/US2022/037020.

*Primary Examiner* — Jason L Vaughan
*Assistant Examiner* — Amanda Kreiling
(74) *Attorney, Agent, or Firm* — MASCHOFF BRENNAN

(57) ABSTRACT

A method may include positioning one or more PV module mounting devices along a length of a structural component. The method may include specifying one or more parameters related to fastening the PV module mounting devices to the structural component, the one or more parameters indicating a spacing between the PV module mounting devices. The method may include fastening, by an automated attachment equipment, the PV module mounting devices to the structural component based on the specified parameters and moving the PV module mounting devices fastened to the structural component to an assembly platform.

10 Claims, 11 Drawing Sheets

(56) References Cited

U.S. PATENT DOCUMENTS

| | | | |
|---|---|---|---|
| 2014/0360552 A1* | 12/2014 | Britcher | B65D 19/44 |
| | | | 211/85.8 |
| 2016/0065121 A1* | 3/2016 | Bugg | H02S 20/10 |
| | | | 29/525.08 |
| 2016/0365825 A1* | 12/2016 | Poivet | F24S 25/13 |
| 2019/0134822 A1* | 5/2019 | Clemenzi | H02S 20/32 |
| 2020/0350850 A1* | 11/2020 | Di Stefano | F24S 25/12 |

* cited by examiner

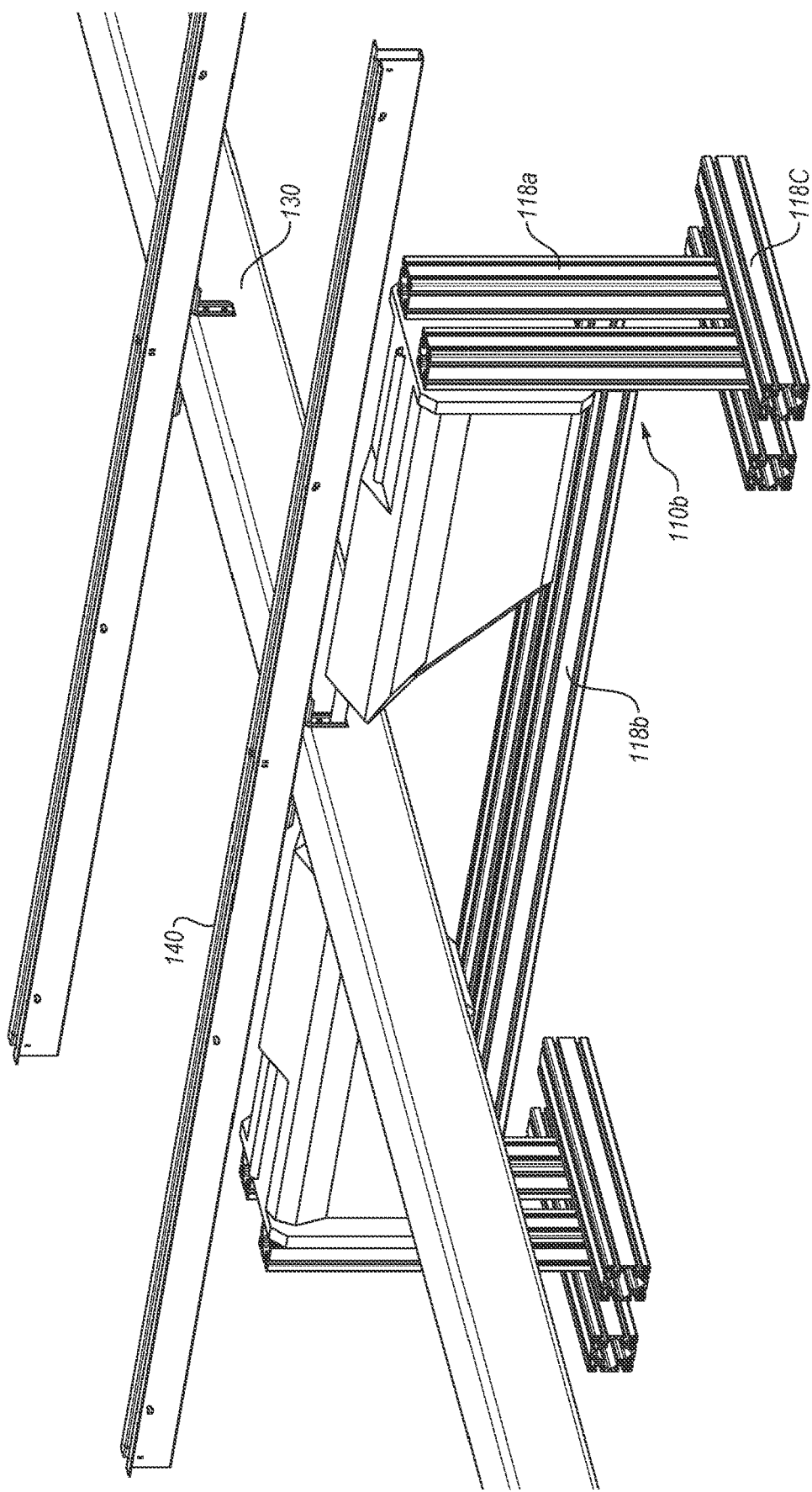

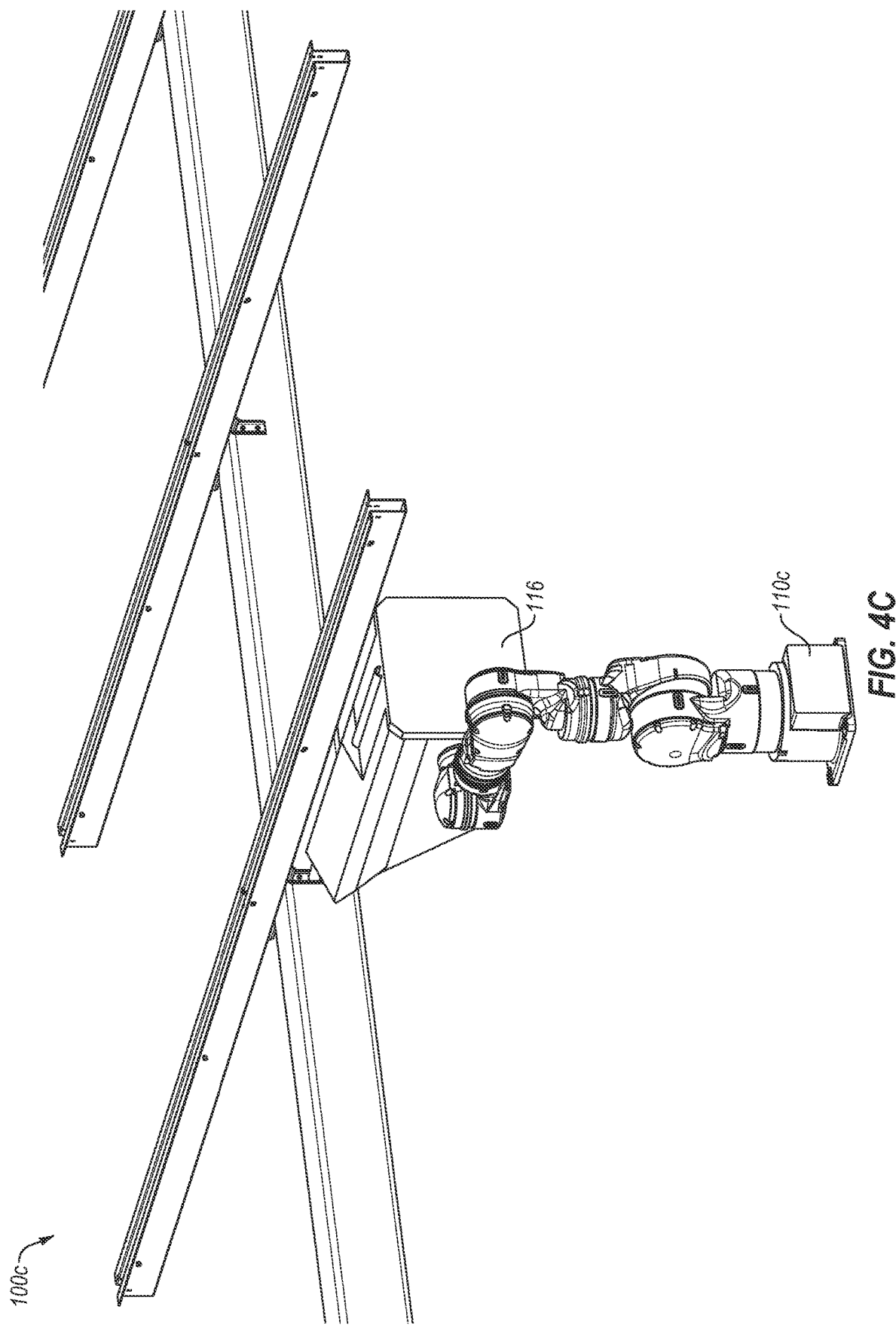

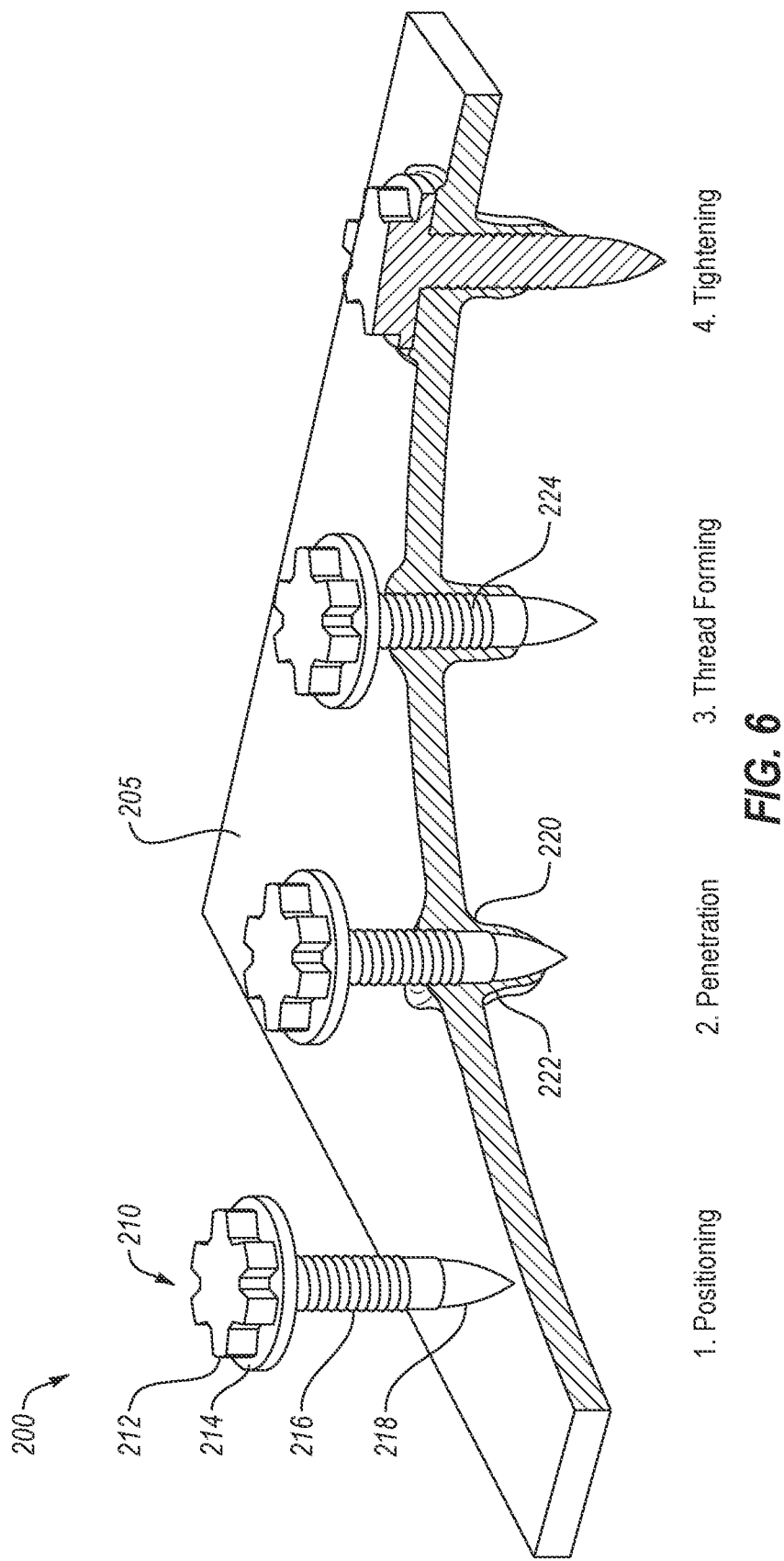

AUTOMATED ATTACHMENT OF SOLAR COMPONENTS

CROSS-REFERENCE TO RELATED APPLICATION

This application claims the benefit of U.S. patent application Ser. No. 63/221,348, filed on Jul. 13, 2021, the disclosure of which is incorporated herein by reference in its entirety.

FIELD OF THE INVENTION

The present disclosure generally relates to a system and method of automated attachment of solar components.

BACKGROUND

Systems of solar panels may include one or more photovoltaic (PV) modules. The PV modules may be mounted in rows on solar trackers that direct an orientation of the PV modules such that the orientation of the PV modules changes throughout a day. The PV modules may be placed in an outdoor location such that the PV modules may receive sunlight with little or no obstruction.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include positioning one or more PV module mounting devices along a length of a structural component. The method may include specifying one or more parameters related to fastening the PV module mounting devices to the structural component, the one or more parameters indicating a spacing between the PV module mounting devices. The method may include fastening, by an automated attachment equipment, the PV module mounting devices to the structural component based on the specified parameters and moving the PV module mounting devices fastened to the structural component to an assembly platform.

In some embodiments, the assembly platform may be part of or coupled to a transportable component.

In some embodiments, fastening, by the automated attachment equipment, the PV module mounting devices to the structural component may include using an automatic feeder that sequentially provides PV module mounting devices to be fastened to the structural component, the automatic feeder moving the PV module mounting devices along an axis while the structural component remains stationary.

In some embodiments, fastening, by the automated attachment equipment, the PV module mounting devices to the structural component may include using an automatic feeder that sequentially provides PV module mounting devices to be fastened to the structural component, the automatic feeder moving the structural component along an axis while the PV module mounting devices remain stationary.

In some embodiments, the automated attachment equipment may be configured to move along at least one of three axes, the three axes including a first axis along an x-direction, a second axis along a y-direction, and a third axis along a z-direction.

In some embodiments, specifying the one or more parameters may be based on a size or an orientation of the PV module mounting device.

In some embodiments, fastening the PV module mounting devices to the structural component may involve a flow drill fastening process that includes driving a fastener into a surface of one of the PV module mounting devices that is in contact with the structural component or through a hole in the surface of the one of the PV module mounting devices that is in contact with the structural component. The flow drill fastening process may include rotating the fastener at a rotational rate that forms a flowing material from the structural component or the surface of each of the PV module mounting devices and forming threads in a hole formed by driving the fastener into the surface of one of the PV module mounting devices that is in contact with the structural component by decreasing the rotational rate of the fastener.

In some embodiments, fastening the PV module mounting devices to the structural component includes may involve driving a drill bit through a surface of the structural component that is aligned with a surface of one of the PV module mounting devices to form an aligned hole through the structural component and the PV module mounting device and inserting a blind fastener through the aligned hole.

In some embodiments, fastening the PV module mounting devices to the structural component may include spot welding the PV module mounting devices to the structural component or securing each of the PV module mounting devices to the structural component using a clinch joint.

According to an aspect of an embodiment, a photovoltaic (PV) module mounting device assembly system may include one or more PV module mounting devices positioned along a length of a structural component and an automated attachment equipment that is configured to fasten the PV module mounting devices to the structural component. The PV module mounting device assembly system may include an assembly platform onto which the PV module mounting devices fastened to the structural component are moved after fastening.

In some embodiments, the assembly platform may be part of or coupled to a transportable component.

In some embodiments, the PV module mounting device assembly system may further include an automatic feeder that sequentially provides the PV module mounting devices to be fastened to the structural component, the automatic feeder moving the structural component along an axis while the PV module mounting devices remain stationary.

In some embodiments, the PV module mounting device assembly system may further include an automatic feeder that sequentially provides the PV module mounting devices to be fastened to the structural component, the automatic feeder moving the PV module mounting devices along an axis while the structural component remains stationary.

In some embodiments, the automated attachment equipment may be configured to move along at least one of three axes, the three axes including a first axis along an x-direction, a second axis along a y-direction, and a third axis along a z-direction.

In some embodiments, the PV module mounting devices may be fastened to the structural component according to one or more parameters specified based on a size or an orientation of a PV module.

In some embodiments, the automated attachment equipment may be configured to use a flow drill fastening process that includes driving a fastener into a surface of one of the PV module mounting devices that is in contact with the structural component or through a hole in the surface of the one of the PV module mounting devices that is in contact with the structural component. The flow drill fastening process may involve rotating the fastener at a rotational rate that forms a flowing material from the structural component or the surface of each of the PV module mounting devices and forming threads in a hole formed by driving the fastener into the surface of one of the PV module mounting devices that is in contact with the structural component by decreasing the rotational rate of the fastener.

In some embodiments, the automated attachment equipment may be configured to drive a drill bit through a surface of the structural component that is aligned with a surface of one of the PV module mounting devices to form an aligned hole through the structural component and the PV module mounting device and insert a blind fastener through the aligned hole.

In some embodiments, the automated attachment equipment may be configured to spot weld the PV module mounting devices to the structural component or secure each of the PV module mounting devices to the structural component using a clinch joint.

According to an aspect of an embodiment, a system may include one or more processors and one or more non-transitory computer-readable storage media configured to store instructions that, in response to being executed, cause a photovoltaic (PV) module mounting device assembly system to perform operations. The operations may include instructing one or more robotic components to position one or more PV module mounting devices along a length of a structural component. The operations may also include specifying one or more parameters related to fastening the PV module mounting devices to the structural component, the one or more parameters indicating a spacing between the PV module mounting devices. The method may include instructing automated attachment equipment to fasten the PV module mounting devices to the structural component based on the specified parameters and instructing the one or more robotic components to move the PV module mounting devices fastened to the structural component along an assembly platform.

In some embodiments, fastening the PV module mounting devices to the structural component may involve a flow drill fastening process that includes instructing the automated attachment equipment to drive a fastener into a surface of one of the PV module mounting devices that is in contact with the structural component or through a hole in the surface of the one of the PV module mounting devices that is in contact with the structural component. The flow drill fastening process may include instructing the automated attachment equipment to rotate the fastener at a rotational rate that forms a flowing material from the structural component or the surface of each of the PV module mounting devices and instructing the automated attachment equipment to decrease the rotational rate of the fastener to facilitate formation of threads in a hole formed by driving the fastener into the surface of one of the PV module mounting devices that is in contact with the structural component.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 4A is a close-up view of the second example embodiment illustrating a second attachment equipment including a single-axis rail support according to the present disclosure;

FIG. 4C is a close-up view of a third example embodiment illustrating a multi-axis robotic arm support of the system of automated attachment of solar components according to the present disclosure;

FIG. 6 illustrates installation of a fastener based on a flow drill fastening process.

DETAILED DESCRIPTION

Solar panel systems including one or more PV modules are currently installed manually using hand-held alignment jigs, impact drivers, and/or torque wrenches to attach the PV modules to a structural component such as a torque tube or a module frame. Attaching the PV modules to the structural component may involve drilling holes into the structural component so that the PV modules may be coupled to the structural component via one or more mounting devices such as mounting clamps, screws, bolts, etc. However, drilling holes into the structural component at the installation site in the solar field may increase labor time and costs. Additionally, pre-drilling such holes off-site may reduce project and/or supply-chain flexibility because the spacing, locations, and/or sizing of the holes may be project-specific based on geographical limitations, PV module specifications, and/or other considerations. Alternatively, the mounting devices may be clamped to the structural component without drilling holes. However, such methods of coupling the mounting devices to the structural component may involve additional clamping components and labor for installation.

The present disclosure relates to, among other things, an automated attachment method of fastening mounting devices to the structural component on-site in the solar field. The structural component and the mounting devices may be shipped to the installation site with or without any component pre-processing prior to shipping the structural component and the mounting devices to the installation site. Automated attachment equipment may be configured to determine a spacing between mounting devices coupled to the structural component and fasten the mounting devices to the structural component according to the determined spacing. Installation of solar components according to the present disclosure may streamline the supply chain and logistics of the structural component and/or the mounting devices and reduce labor costs associated with the installation. Additionally or alternatively, the speed and/or accuracy of installations may be improved by the automated attachment method. In some embodiments, a flow drill fastener may be implemented with the automated attachment method such that attachment of mounting devices to the structural components may be more secure, and/or maintenance of PV modules may be improved because removable threaded fasteners may be used to install the PV modules by the flow drill fastener. Additionally, the use of a flow drill fastener may permit the secure coupling of components without access to a back surface of the fastener. For example, when coupling to a torque tube where it is difficult to access the inside of the tube, the flow drill fastener may provide a secure connection without access to the inside of the torque tube.

Embodiments of the present disclosure will be explained with reference to the accompanying drawings.

Figure 1A:
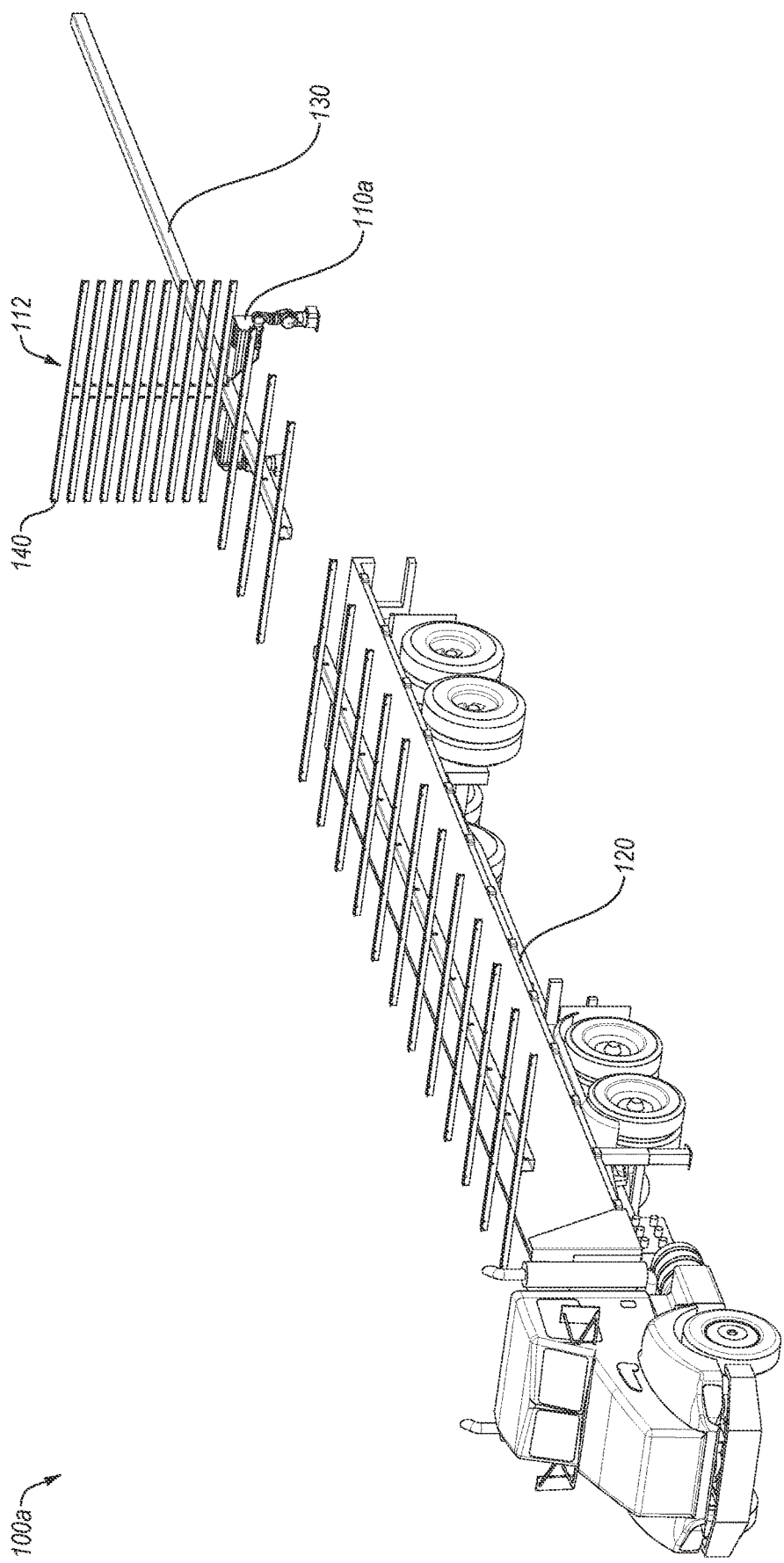
FIG. 1A illustrates a first example embodiment of a system of automated attachment of solar components according to the present disclosure.

FIG. 1A illustrates a first example system 100a of automated attachment of solar components according to the present disclosure. The first system 100a may include attachment equipment 110a, which may be configured to fasten one or more mounting devices 140 to a structural component 130 of a PV tracker (such as a clamp to a torque tube, etc.). Additionally or alternatively, the attachment equipment 110a may be configured to couple two structural components 130 together. In some embodiments, operation of the attachment equipment 110a may be performed on an assembly platform 120.

The structural component 130 may include any of a torque tube, a frame, and/or any other support structures on which one or more PV modules may be mounted, whether directly or indirectly. The mounting devices 140 may include clamps, purlins, rails, motor support structures, wire-management hooks, and/or any other devices configured to interface with the PV modules mounted on the structural component 130 and secure an alignment and/or position of the PV modules relative to the structural component 130.

The attachment equipment 110a may include any tool, mechanism, machine, system, or other component to facilitate fixedly coupling of the mounting devices 140 to the structural component 130. In these and other embodiments, the attachment equipment 110a may or may not include a motive component, such that the attachment equipment 110a may be able to move with one, two, or three degrees of freedom.

In some embodiments, the attachment equipment 110a may include an automated feeder 112, which is configured to sequentially provide mounting devices 140 to be fastened to the structural component 130. The attachment of the mounting devices 140 along a length of the structural component 130 may be facilitated by moving the structural component 130 relative to the attachment equipment 110a after attachment of each of the successive mounting devices 140. The movement of the structural component 130 relative to the attachment equipment 110a may facilitate attachment of the mounting devices 140 at uniform intervals from one another along the length of the structural component 130. In these and other embodiments, the structural component 130 may feed onto the assembly platform 120 such that sections of the structural component 130 to which the mounting devices 140 have been attached are moved onto the assembly platform 120 while sections of the structural component 130 to which the mounting devices 140 have not yet been attached may be aligned to the automated feeder 112 of the attachment equipment 110a.

As illustrated in FIG. 1A, in some embodiments, the assembly platform 120 may be part of or coupled to a trailer bed or other transportable component. In these and other embodiments, doing so may facilitate rapid and efficient deployment of the structural component 130 to which the mounting devices 140 have been coupled.

Figure 1B:
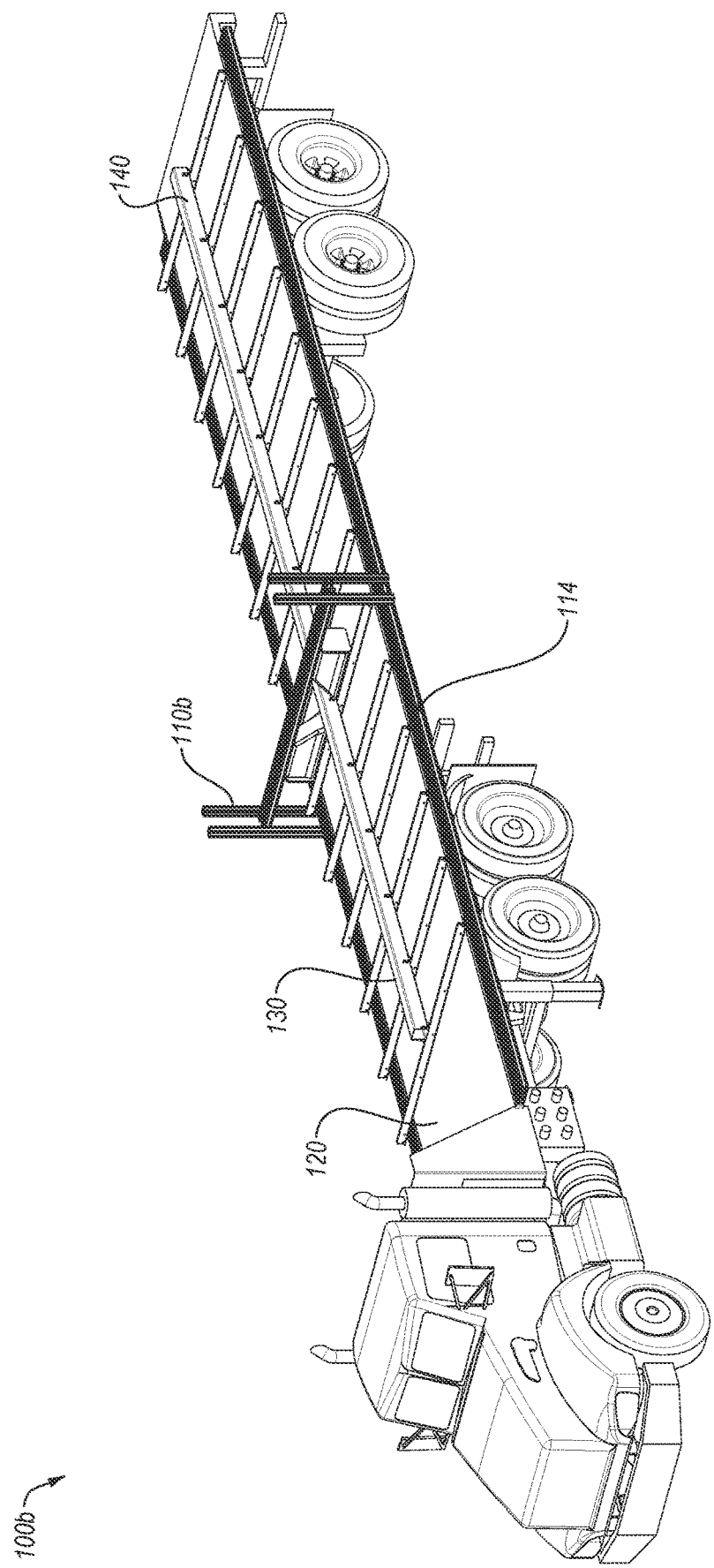
FIG. 1B illustrates a second example embodiment of the system of automated attachment of solar components according to the present disclosure.

FIG. 1B illustrates a second example system 100b of automated attachment of solar components according to the present disclosure. The system 100b may include the structural component 130 and/or the mounting devices 140 positioned on an assembly platform 120. Adjustable attachment equipment 110b may move along an axis aligned with a length of the assembly platform 120 on rails 114 positioned on a perimeter of the assembly platform 120. As such, the movement of the adjustable attachment equipment 110b relative to the structural component 130 may facilitate attachment of the mounting devices 140 at uniform intervals from one another along the length of the structural component 130.

While not shown, the automatic feeder 112 of FIG. 1A may be configured to also move along the assembly platform 120 such that as the adjustable attachment equipment 110b moves along the length of the structural component 130, the automatic feeder 112 may also move to provide the mounting devices 140 at the appropriate locations.

Figure 2:
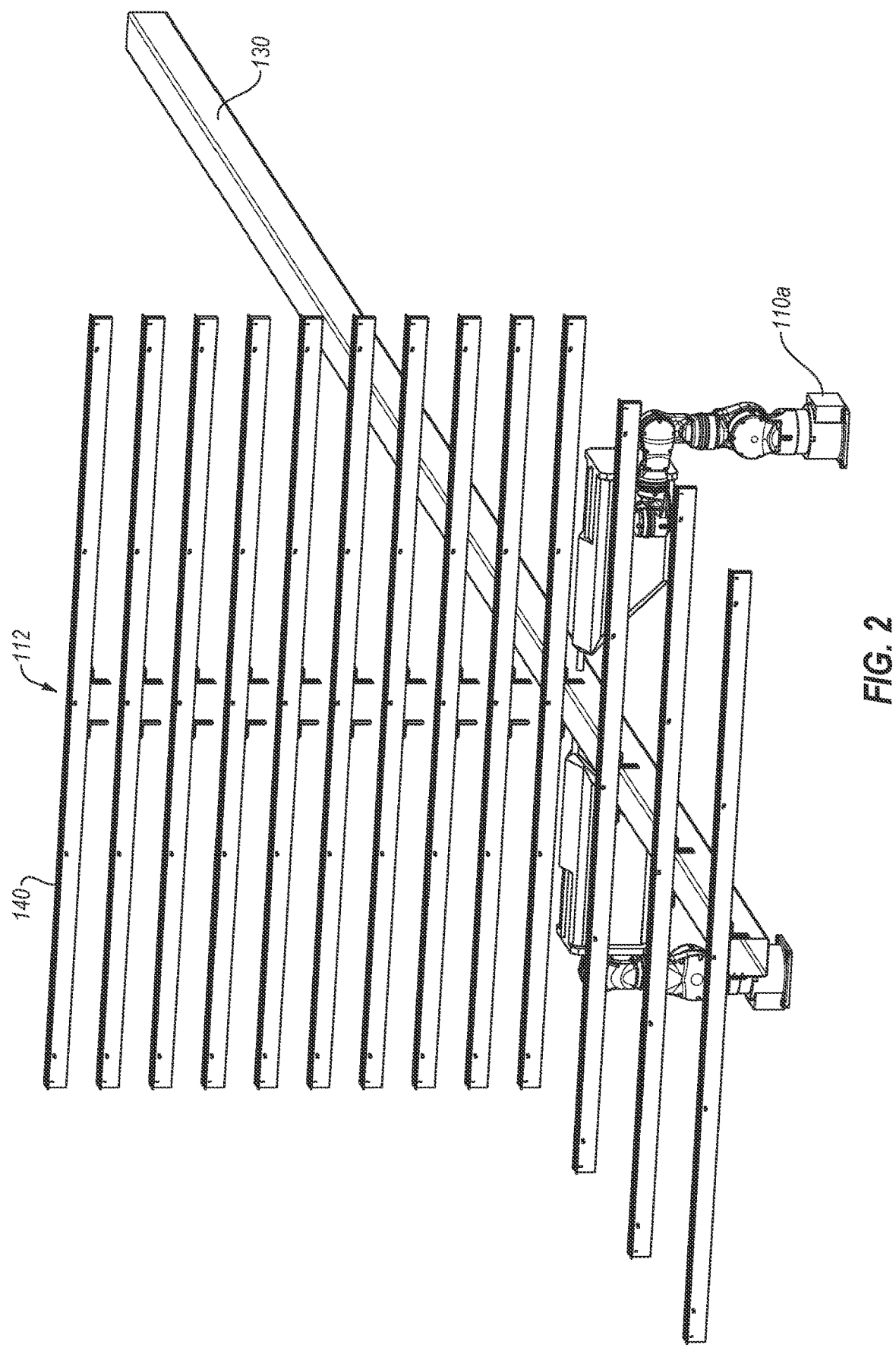
FIG. 2 is a close-up view of the first example embodiment illustrating an automated solar component feed according to the present disclosure.

FIG. 2 is a close-up view illustrating the automated feeder 112 of the system 100a according to the present disclosure. One or more of the mounting devices 140 may be fed from above, while the structural component 130 conveys below the automated feeder 112. In some embodiments, the stationary attachment equipment 110a may fasten the mounting devices 140 to the structural component 130 at one or more predetermined intervals. For example, the structural component 130 may move a given distance and stop to facilitate attachment of a first mounting device 140 before again moving the given distance and stopping to facilitate attachment of a second mounting device 140. As another example, PV module environmental site factors (e.g., uneven elevations, geographic obstacles, etc.) and/or component considerations (e.g., sizing of PV modules, location of PV modules along a torque tube, etc.) may indicate that the mounting devices 140 should be attached to the structural component 130 at irregular intervals. In these and other examples, the structural component 130 may move a first given distance and stop to facilitate attachment of the mounting devices 140 with a first spacing between each of the mounting devices and move a second given distance between coupling of the mounting devices 140 to the structural component 130 to facilitate attachment of the mounting devices 140 with a second spacing between each mounting device 140. In these and other embodiments, a spacing between two or more PV modules may be specified for each installation project, and a computing system may be configured to adjust the spacing between attachment of one or more of the mounting devices 140 to the structural component 130.

Figure 3A:
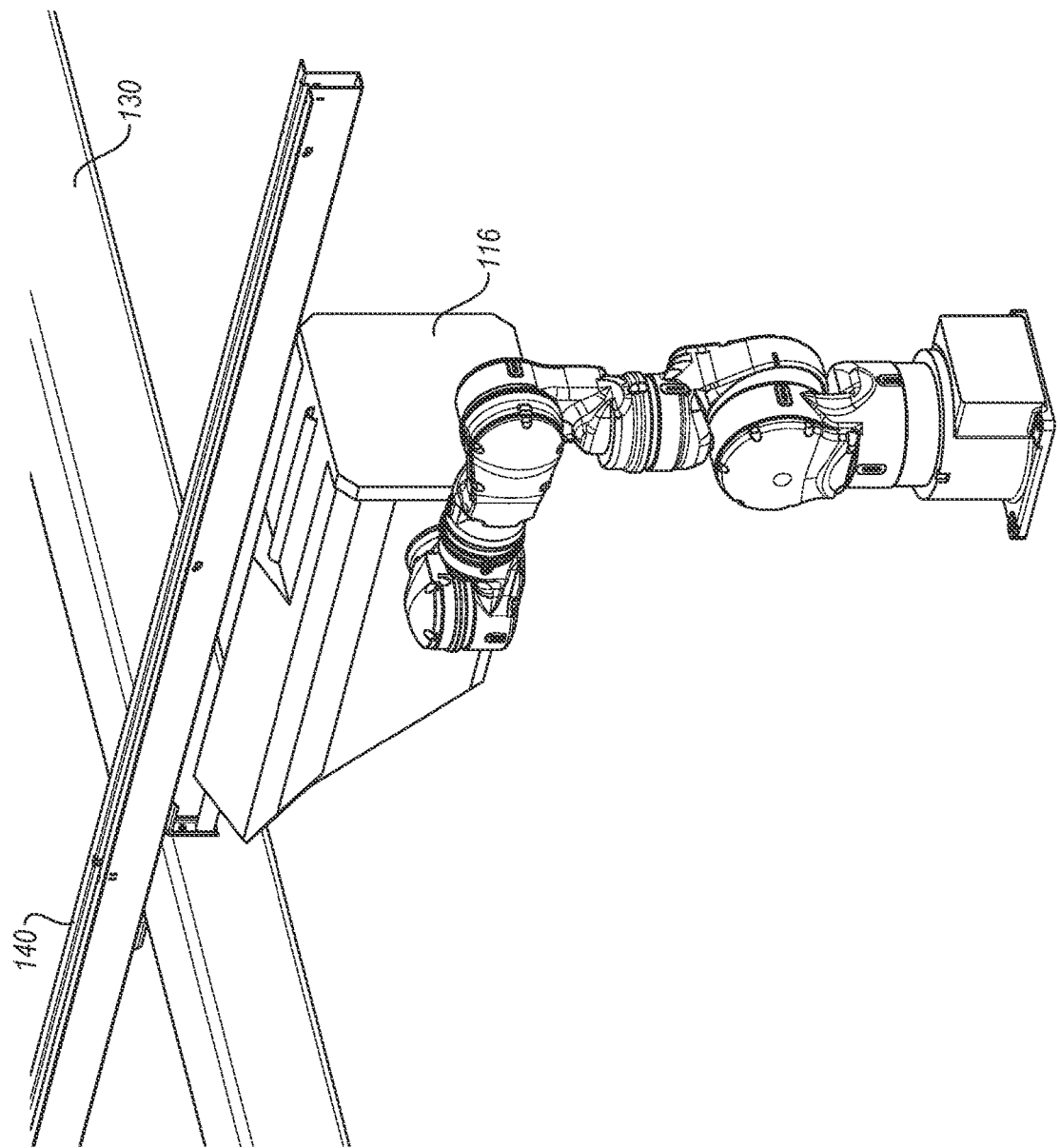
FIG. 3A illustrates flow drill fastener installer included in the system of automated attachment of solar components according to the present disclosure.
Figure 3B:
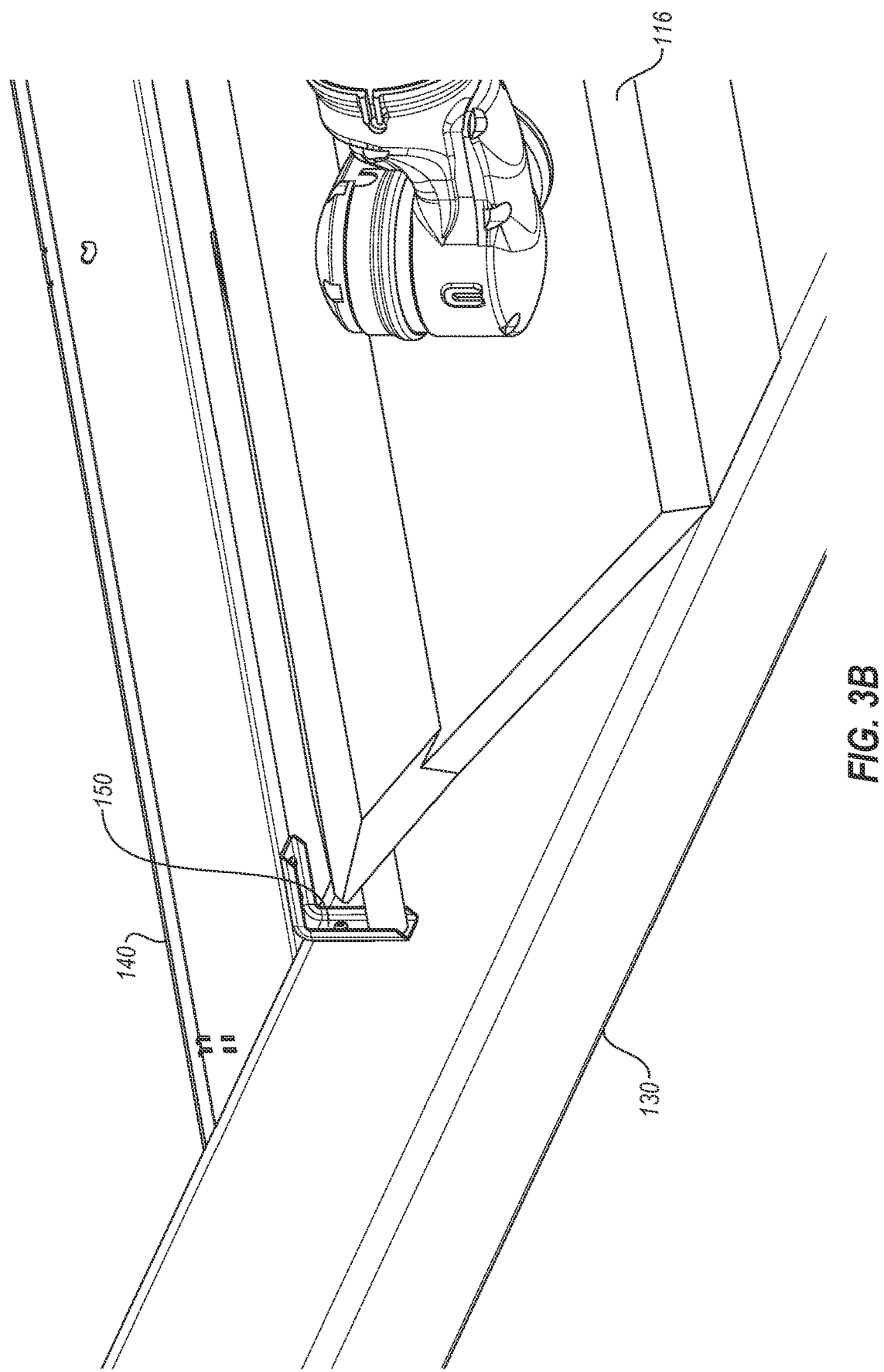
FIG. 3B is a close-up view depicting attachment of a fastener through a mounting device and a structural component using the flow drill fastener installer according to the present disclosure.

In some embodiments, the mounting devices 140 may be attached to the structural component 130 by a flow drill fastening process. FIG. 3A illustrates a flow drill fastener installer 116 included in the system 100a of automated attachment of solar components. The flow drill fastener installer 116 may be positioned on the attachment equipment 110 and aligned to fasten the mounting devices 140 to the structural component 130. FIG. 3B is a close-up view depicting attachment of a fastener strip 150 to the mounting device 140 and the structural component 130 using the flow drill fastener installer 116 according to the present disclosure. As illustrated above in relation to FIG. 2, each of the fastener strips 150 may be attached to a respective mounting device 140 such as during the manufacturing of the mounting device 140. The flow drill fastener installer 116 may be configured to affix one or more fasteners through the fastener strip 150 to attach the fastener strip 150 to the structural component 130, which may couple the structural component 130 to the corresponding mounting device 140. Additionally or alternatively, the fastener strip 150 may be attached to the structural component 130 during manufacturing, and the flow drill fastener installer 116 may be configured to affix one or more fasteners through the fastener strip 150 to attach the fastener strip 150 to each of the mounting devices 140. The flow drill fastening process is described in further detail below in relation to FIG. 6.

Although illustrated as a flow drill fastener installer 116, one or more similar approaches may be used. For example, clinch joints, self-piercing rivets, spot welds, and/or other metal-attachment methods may be used in lieu of or in conjunction with the flow drill fastener installer 116 to attach the mounting devices 140 to the structural component 130.

FIG. 4A is a close-up view of the system 100b illustrating a second attachment equipment 110b including a series of single-axis rail supports according to the present disclosure. In some embodiments, the attachment equipment 110b may include a first guiding rail 118a, a second guiding rail 118b, and a third guiding rail 118c. The first guiding rail 118a may extend vertically from the third guiding rail 118c in a direction perpendicular to or substantially perpendicular to the third guiding rail 118c. The attachment equipment 110b may include a fastener installer, such as the flow drill fastener installer 116, that is coupled to the first guiding rail 118a such that a height of the fastener installer may be adjusted along a length of the first guiding rail 118a. In some embodiments, the second guiding rail 118b may extend horizontally from the first guiding rail 118a in a direction perpendicular to or substantially perpendicular to the first guiding rail 118a and/or the third guiding rail 118c. The fastener installer of the attachment equipment 110b may be positioned on top of and coupled to the second guiding rail 118b such that sliding along the length of the second guiding rail 118b may adjust the fastener installer towards and/or away from the structural component 130. In some embodiments, the third guiding rail 118c may extend generally horizontally with the length of the structural component 130. The fastener installer of the attachment equipment 110b may be moved along a length of structural component 130 up to approximately the length of the third guiding rail 118c by the first guiding rail 118a sliding along the length of the third guiding rail 118c. In some embodiments, the first guiding rail 118a may not move along the length of the third guiding rail 118c and the position of the structural component 130 relative to the attachment equipment 110b may be adjusted by moving the structural component 130. An automated attachment system including the attachment equipment 110b may facilitate adjustment of the fastener installer to accommodate structural components 130 and/or mounting devices 140 of varying specifications.

Figure 4B:
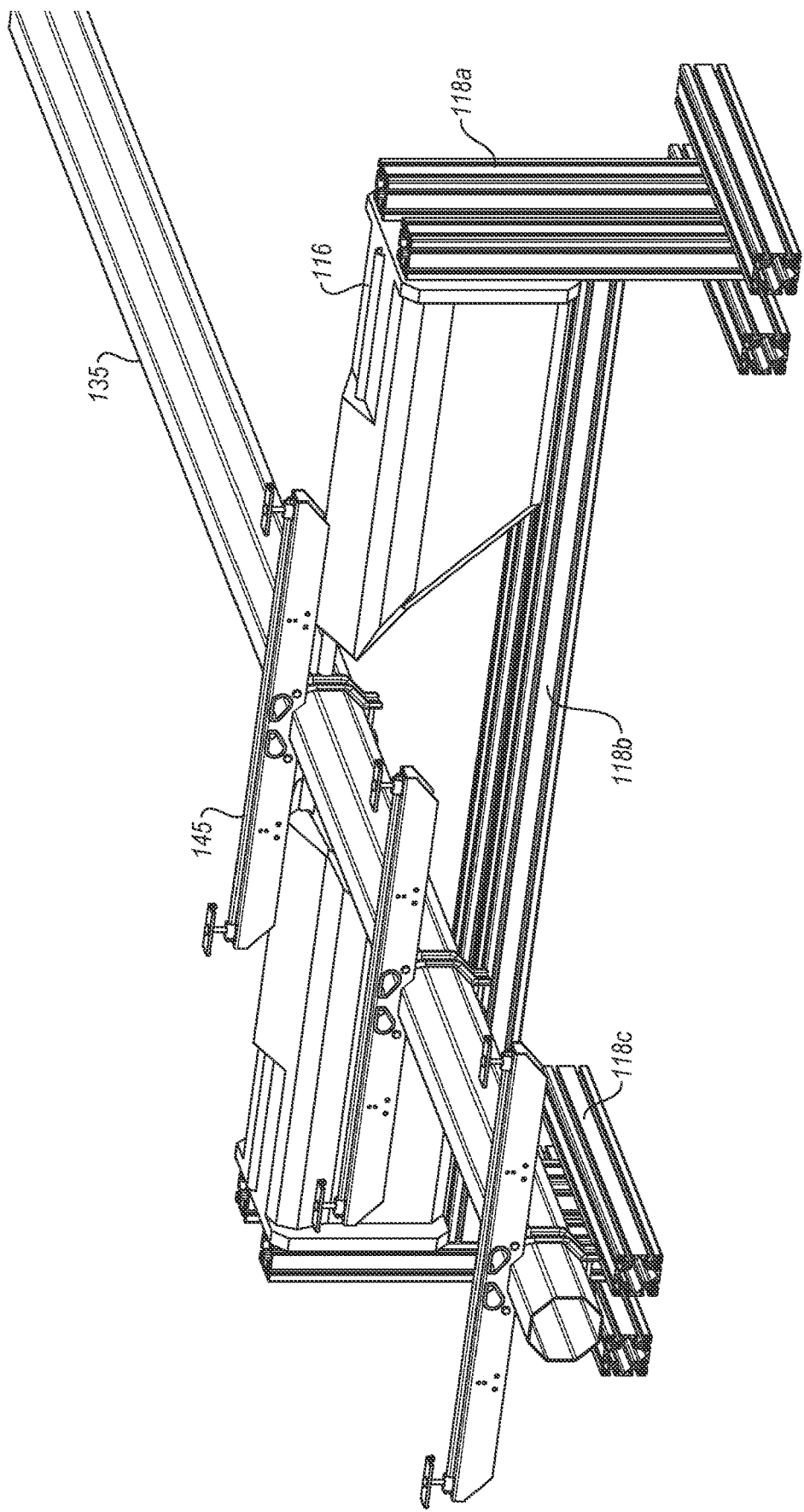
FIG. 4B is a close-up view of the second example embodiment including an octagonal torque tube and a different style of module clamps according to the present disclosure.

In some embodiments, an automated attachment system according to the present disclosure may be configured to attach mounting devices of various styles to structural components of various styles. In these and other embodiments, the position of the fastener installer may be adjusted to align with various styles of mounting devices 140 and/or structural components 130. For example, FIG. 4B is a close-up view of the system 100b including an octagonal torque tube 135 as the structural component 130 and a different style of module clamps 145 as the mounting device 140. As illustrated in FIG. 4B, the position of the flow drill fastener installer 116 may be adjusted along the first guiding rail 118a, the second guiding rail 118b, and/or the third guiding rail 118c to align with the module clamp 145 and the octagonal torque tube 135.

FIG. 4C is a close-up view of a third example system 100c illustrating a multi-axis robotic arm support 110c according to the present disclosure. The multi-axis robotic arm support 110c may increase the rotational and/or positional flexibility and adaptability of the flow drill fastener installer 116. In some embodiments, the multi-axis robotic arm support 110c may facilitate setting more specific and/or nuanced settings for attachment of mounting devices to the structural component and/or coupling other components to the mounting devices before and/or after coupling the mounting devices to the structural component. For example, one multi-axis robotic arm support 110c may facilitate attachment of the fastener strip 150 to the structural component 130 and/or attachment of the fastener strip 150 to one or more of the mounting devices 140 in lieu of multiple pieces of attachment equipment such as the attachment equipment 110a and/or 110b.

Figure 4D:
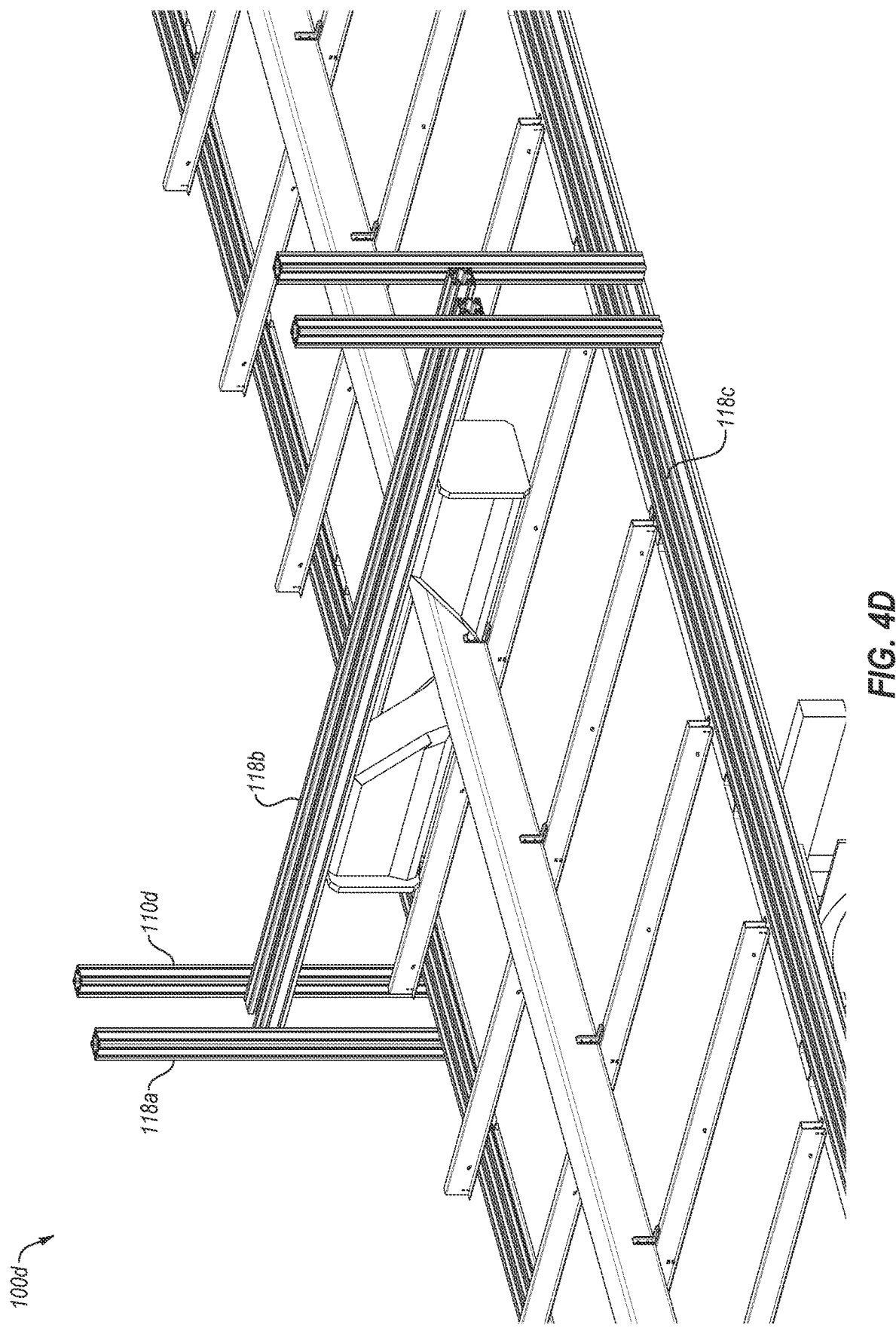
FIG. 4D is a close-up view of a fourth example embodiment illustrating a tri-axis rail support of the system of automated attachment of solar components according to the present disclosure.

FIG. 4D is a close-up view of a fourth example system 100d illustrating a tri-axis rail support 110d according to the present disclosure. In some embodiments, the attachment equipment 110b may include a first guiding rail 118a, a second guiding rail 118b, and a third guiding rail 118c. In some embodiments, the first guiding rail 118a and/or the second guiding rail 118b may be the same as or similar to the guiding rails described above in relation to FIG. 4A. The third guiding rail 118c may extend along approximately an entire length of the structural component 130, and the attachment equipment 110b may slide along the third guiding rail 118c such that the attachment equipment 110b may fasten the mounting devices 140 to the structural component 130 at any point along the length of the structural component 130. In some embodiments, the third guiding rail 118c may be positioned in the same or a similar position as the third guiding rail 118c as described above in relation to FIG. 4A. In some embodiments, an automated feeder, such as the automated feeder 112 as described above in relation to FIG. 2, may be used with the tri-axis rail support 110d to provide and/or position mounting devices for attachment to the structural component.

Figure 5:
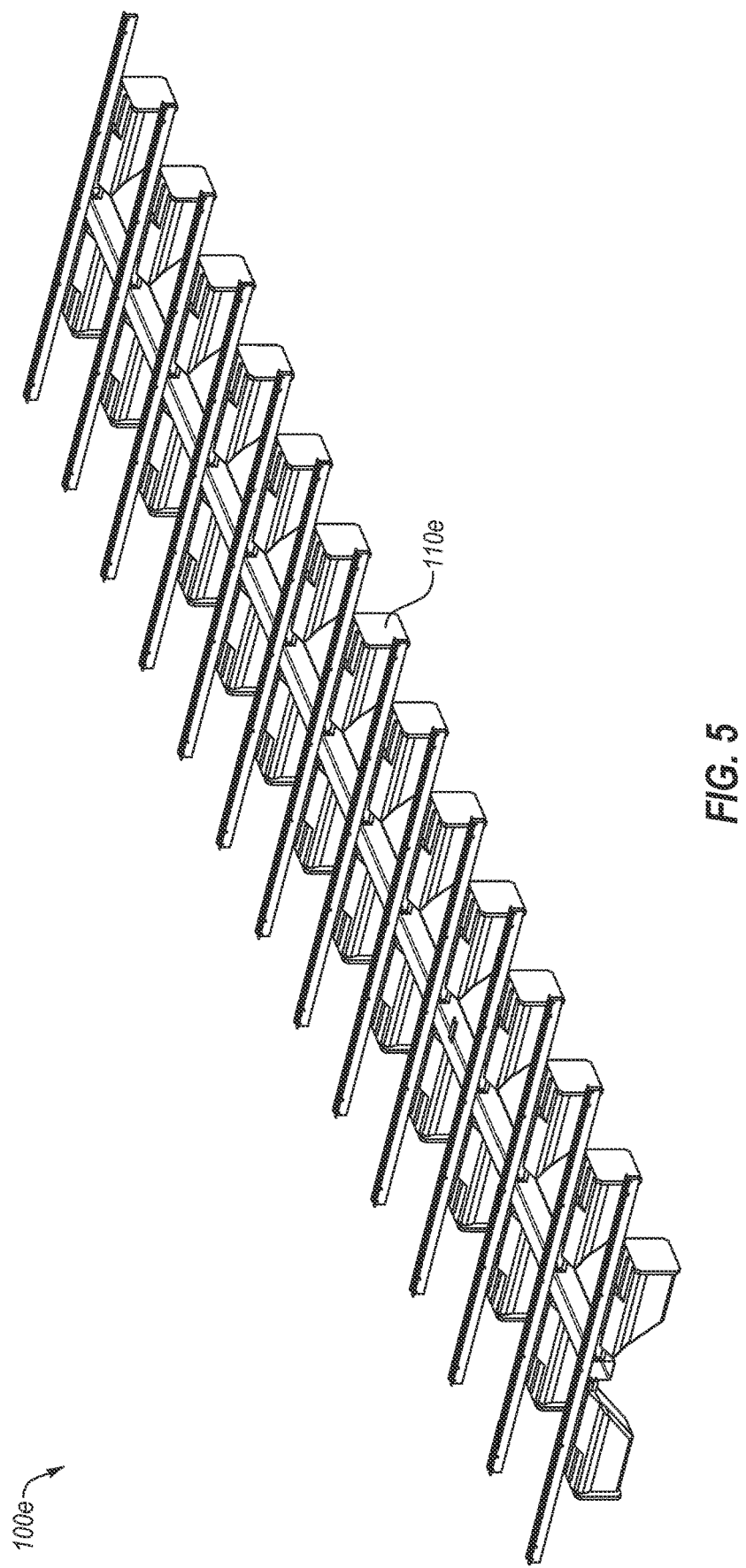
FIG. 5 illustrates a fifth example embodiment of the system of automated attachment of solar components including multiple attachment equipment spindles according to the present disclosure.

FIG. 5 illustrates a fifth example system 100e of automated attachment of solar components including multiple attachment equipment stations 110e according to the present disclosure. In some embodiments, the assembly platform (not shown) of the structural component may be stationary, and multiple attachment equipment stations 110e may be used to fasten multiple mounting devices to the structural component at the same time, in quick succession, and/or with reduced movement of the structural component. In these and other embodiments, each of the attachment equipment stations 110e may include the same as or similar attachment equipment as the attachment equipment 110a as described above in relation to FIG. 1A. Additionally or alternatively, each of the attachment equipment stations 110*e* may include the same as or similar attachment equipment as any of the attachment equipment 110*b-d*.

While FIG. 5 illustrates a sufficient number of the attachment equipment stations 110*e* to attach all of the mounting devices to the structural component at once, in some embodiments, a smaller number of stations is also contemplated. For example, if the system 100*e* included four attachment equipment stations 110*e*, the structural component may be moved into place and two or four distinct mounting devices may be attached to the structural component. The structural component may then be moved relative to the four attachment equipment stations 110*e* such that the four attachment equipment stations 110*e* may be positioned and ready for a next batch of mounting devices to attach to the structural component.

FIG. 6 illustrates installation of a fastener based on a flow drill fastening ("FDF") process 200. In some embodiments, the FDF process 200 may include positioning a fastener 210, penetrating a sheet of metal 205, forming threads 224 in the hole formed by the penetration, and tightening the fastener 210. In some embodiments, the fastener 210 used in the FDF process 200 may include a fastener head 212, a flange 214, a (partially) threaded body 216, and a boring component 218. In some embodiments, the flow drill fastener installer 116 (not shown) may be configured to hold the fastener head 212 such that the boring component 218 is directed toward the sheet of metal 205, which may represent the fastener strip 150, a surface of the mounting device 140, and/or a surface of the structural component 130. As such, positioning of the flow drill fastener installer 116 may correspond to positioning of the fastener 210.

After positioning the fastener 210, the fastener 210 may be rotated at a high rate (e.g., 8,000 to 9,000 RPM) and pressed into the sheet of metal 205 with high force to generate localized frictional heat that facilitates penetrating the sheet of metal 205 and creating a hole 220 including a molded wall 222 and causing the metal into which the fastener 210 is being driven (e.g., the sheet of metal 205) to form a flowable material. The rotational speed of the fastener 210 may be reduced after forming the hole 220 such that the threads 224 may be formed in the molded wall 222 that forms of the flowable material. The fastener 210 may be tightened in the hole 220 after formation of the hole 220 and the threads 224. Stated another way, the FDF process may include an initial, high speed period of rotation (corresponding to "2. Penetration") followed by a second, slower speed period of rotation (corresponding to "3. Thread forming") in which threads are formed in the sheet of metal 205 as the flowing metal resolidifies.

The FDF process may improve attachment of the fastener 210 to a structural component (such as a torque tube) relative to other attachment processes because the FDF process may attach the fastener 210 to the structural component while only accessing one side of the structural component. As such, the FDF process does not require accessing the interior of the structural component to attach the fastener 210 to the structural component, which may simplify the attachment process. For example, attachment of the fastener 210 by the FDF process may remove the need for using a nut coupled to the fastener 210 via the interior of the structural component to secure the fastener 210 to the structural component, e.g., the fastener may couple the components without the use of a nut.

Modifications, additions, or omissions may be made to any of the foregoing FIGS. 1A-6 without departing from the scope of the present disclosure. For example, the designations of different elements in the manner described is meant to help explain concepts described herein and is not limiting. Further, the systems 100*a-e* may include any number of other elements or may be implemented within other systems or contexts than those described.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A photovoltaic (PV) module mounting device assembly system, comprising:
   one or more PV module mounting devices positioned along a length of a structural component;
   an automated attachment equipment including a fastener installer that is configured to move along a first axis, a second axis, and a third axis and fasten the PV module mounting devices to the structural component at any point along the structural component along the first axis, the second axis, and/or the third axis; and an assembly platform onto which the PV module mounting devices fastened to the structural component are positioned.

2. The PV module mounting device assembly system of claim 1, wherein the assembly platform is part of or coupled to a transportable component.

3. The PV module mounting device assembly system of claim 1, further comprising an automatic feeder that sequentially provides the PV module mounting devices to be fastened to the structural component, the automatic feeder moving the structural component along an axis while the PV module mounting devices remain stationary.

4. The PV module mounting device assembly system of claim 1, further comprising an automatic feeder that sequentially provides the PV module mounting devices to be fastened to the structural component, the automatic feeder moving the PV module mounting devices along an axis while the structural component remains stationary.

5. The PV module mounting device assembly system of claim 1, wherein the PV module mounting devices are fastened to the structural component according to one or more parameters specified based on a size or an orientation of a PV module.

6. The PV module mounting device assembly system of claim 1, wherein the automated attachment equipment is configured to use a flow drill fastening process that includes:
    driving a fastener into a surface of one of the PV module mounting devices that is in contact with the structural component or through a hole in the surface of the one of the PV module mounting devices that is in contact with the structural component;
    rotating the fastener at a rotational rate that forms a flowing material from the structural component or the surface of each of the PV module mounting devices; and
    forming threads in a hole formed by driving the fastener into the surface of one of the PV module mounting devices that is in contact with the structural component by decreasing the rotational rate of the fastener.

7. The PV module mounting device assembly system of claim 1, wherein the automated attachment equipment is configured to:
    drive a drill bit through a surface of the structural component that is aligned with a surface of one of the PV module mounting devices to form an aligned hole through the structural component and the PV module mounting device; and
    insert a blind fastener through the aligned hole.

8. The PV module mounting device assembly system of claim 1, wherein the automated attachment equipment is configured to spot weld the PV module mounting devices to the structural component or secure each of the PV module mounting devices to the structural component using a clinch joint.

9. The PV module mounting device assembly system of claim 1, further comprising a first guiding rail, a second guiding rail, and a third guiding rail in which the first axis is defined by the first guiding rail, the second axis is defined by the second guiding rail, and the third axis is defined by the third guiding rail.

10. The PV module mounting device assembly system of claim 1, wherein the PV module mounting devices fastened to the structural component are moved to the assembly platform after being fastened.

* * * * *